Patented July 9, 1929.

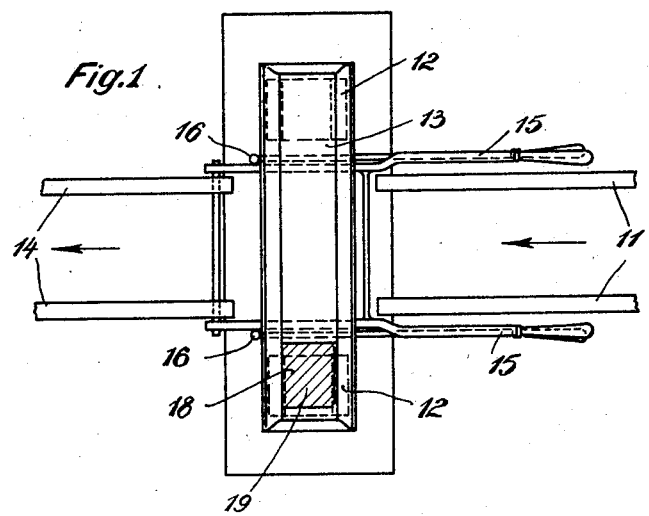
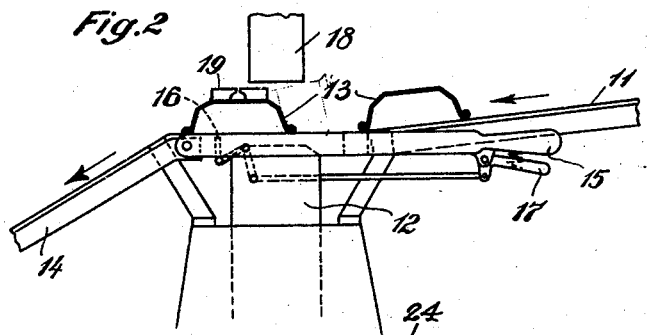
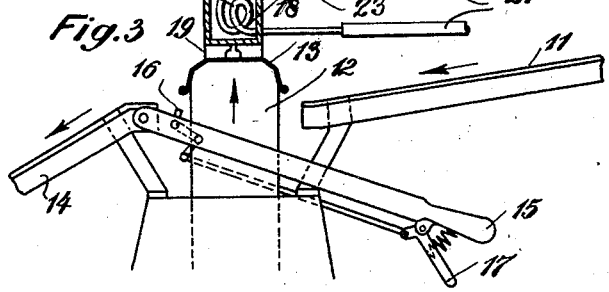

1,720,222

UNITED STATES PATENT OFFICE.

LEO KUHL AND CARL RITZ, OF BERLIN-CHARLOTTENBURG, GERMANY, ASSIGNORS TO SIEMENS-SCHUCKERTWERKE GESELLSCHAFT MIT BESCHRÄNKTER HAFTUNG, OF BERLIN-SIEMENSSTADT, A CORPORATION OF GERMANY.

WELDING APPARATUS FOR ATTACHING TIE PLATES TO STEEL RAILROAD TIES.

Application filed May 10, 1927, Serial No. 190,344, and in Germany March 24, 1926.

Our invention relates to welding apparatus for attaching the tie-plates to steel railroad ties.

In hitherto laid out railroad tracks with steel ties it has been ascertained that the ties are subjected to comparatively great wear and tear. The causes are traceable to the fact that from the slot which serves for the reception of the screws for the rail fixing plates cracks are liable to start and that the ties are furthermore subjected to hard wear owing to the friction of the tie-plates and the fixing plates. It has been attempted to reduce this wear by a new method of attaching the rails to the steel ties according to which the tie-plates are welded to the ties. Upon the tie, the surface of which is shaped in correspondence with the inclination of the rail, are welded two tie-plates which then serve as support or base for the rail. In welding it may now happen that the tie-plates do not make good contact with the tie. When the tie-plate is then loaded stresses are set up in the welded seam which may lead to a destruction of the weld.

According to our invention this risk is eliminated by forcing the tie-plate and the tie against each other during the welding process by a die or punch. In this way the tie-plate rests upon the tie with its entire surface, so that when it is subsequently loaded no stresses are set up in the welded seams. It is naturally quite immaterial whether in carrying through this operation the tie is held stationary and the tie-plate is forced against it or whether the tie together with the tie-plate is forced against a stationary abutment.

If the welded seam is not located in the neutral plane, it may happen when the tie is loaded by the train running along the rail that the welded seam has yet to withstand strains. This may be avoided by pressing the tie-plate during the welding process so strongly against the tie by the punch or die that it is subjected to a strain similar in direction and extent to the strain to which it is subjected in actual operation viz: it is subjected to a preliminary strain. In this process a permanent strain in the weld is set up, but this strain is small and can during the bending strain of the tie under reversal of its direction never attain the magnitude which would be developed if the tie-plate were welded on without being subjected to a preliminary strain.

If the welding process is carried through very quickly or with a plurality of welding heads a large volume of heat is transferred to the plate to be welded in a short time. The consequence of this may be that the tie-plate warps or becomes distorted and renders a good weld impossible. To avoid this the punches or dies may be provided with a device for containing a cooling medium. More particularly they may be made hollow so that the cooling agent may traverse them. Closing members may furthermore be provided which control the supply of cooling medium in dependence of the motion of the punches or plungers.

In order to shorten the preparatory period as far as possible, i. e. the placing of the tie to be treated upon a support and the forcing of the tie-plate against the tie, the device serving for the reception of the tie may be so designed that the tie is positively brought into its correct position in relation to the press plungers, which simultaneously ensure the correct position of the tie-plates in relation to the ties, without a special adjustment being necessary. For this purpose a recess or countersunk portion may, for instance, be provided in a table-like plate which corresponds with the outlines of the tie. The details of the device are immaterial provided the correct position of the tie is ensured as soon as it is placed on the table.

The placing of the tie into the holding device is preferably effected by means of special levers which lift the tie from the supply chute and place it into the correct position in the holding device, lift it out of the holding device again after its treatment has been finished and convey it to the discharge point. In order to attain on the levers an accurate position of the tie above the holding device, a stop capable of disengagement may be provided on the levers. This stop must be thrown out of engagement when the welding is finished to enable the tie to be removed by allowing it to pass unhindered on to the discharge track. The motion of the lever arms may be effected by hand, semi-automatically or fully automatically. The arrangement may be such that by a single motion of the levers the piece treated is removed and the fresh piece to be treated is placed into the holding device.

In order to shorten the preparatory period still more the punches or dies may furthermore be provided with a device by means of which the tie-plates are held in position until they are forced against the tie by the punches. When a fresh tie is to be provided with plates the operator thus fixes the plates to the punches and then presses them against the tie, whether the tie is raised towards the punches or the punches with the tie-plates are lowered on to the tie. In this arrangement the tie-plates are placed without any adjustment in the correct position upon the right portions of the tie. The punches or dies may for this purpose be magnetized in order to hold the tie-plates placed on them until they make firm contact with the tie.

A special adjustment of the parts to be united by welding is in this way rendered unnecessary, since only very few preparatory manual operations are necessary which may be carried out by a small number of unskilled laborers.

In the drawings affixed hereto an embodiment of our invention is illustrated by way of example.

In these drawings:

Fig. 1, represents a plan of the device,

Fig. 2, a side-elevation of the device in its preparatory stage, and

Fig. 3, a side-elevation of the device during the welding process.

Like parts are indicated by like numerals of reference in all the figures of the drawing.

Referring to the drawings, 11 is the supply or feed track for the tie, 12 the device upon which the tie is placed during the treatment, 13 the tie, 14 the track upon which the finished ties are discharged from the apparatus and 15 the system of levers upon which the tie slides from the feed track on to the stops 16 adapted to be operated by the lever 17. For forcing the tie-plates 19 to be welded on against the tie serves the counter-punch or die 18.

For cooling the holding die 18, the latter may be made hollow and contain a cooling coil 20, whose rigid ends protrude outside of the die where they are connected to flexible medium supply conduits 21. One of the rigid ends 20 may contain a valve 23, whose control arm may be linked to a fixed point 24, so that as the die descends and recedes during the operation, the cooling liquid may respectively be supplied through coil 20 and shut off.

Our improved apparatus operates in the following manner: The tie arriving on the track 11 and to be subjected to the treatment is raised by means of the levers 15 and slides along them until it reaches the stops 16. The levers are then lowered and the tie is placed on the die 12 and takes up the correct position. The levers 15 are now lowered idly and the welding process itself can now commence after the die or plunger 18 has been lowered or the device 12 has been raised, as illustrated in Fig. 3. When the welding process is finished the levers 15 are raised, raise in their turn the tie off the holding device 12 and after the stops 16 have been withdrawn by the levers 17 the tie slides on to the discharge track 14. Simultaneously a fresh tie is lifted off the feed track 11 and the working cycle commences again.

Various modifications and changes may be made without departing from the spirit and the scope of the invention, and we desire, therefore, that only such limitations shall be placed thereon as are imposed by the prior art.

We claim as our invention:

1. In a welding apparatus for attaching the tie-plates to steel ties, in combination, a punch for forcing said plate and said tie together during the welding operation, a device for supplying a cooling agent to said punch, and control elements for said agent, operated by said punch and adapted to control the flow of said cooling agent in dependence from the movements of said punch.

2. In a welding apparatus for attaching the tie-plates to steel ties, in combination, means for feeding the ties to the apparatus, a punch for forcing said plate and said tie together during the welding operation, a device for holding said tie in position, levers mounted adjacent to said holding device and forming a continuation of said feeding means for placing a tie received upon said holding device and for removing it therefrom, and stops upon said levers and means for placing them into and removing them from the path of the tie received on said levers, said levers when raised lifting a welded tie from said device and discharging it from the apparatus and simultaneously guiding the next tie from said feeding means to said device.

In testimony whereof we affix our signatures.

LEO KUHL.
CARL RITZ.